Figure 1:
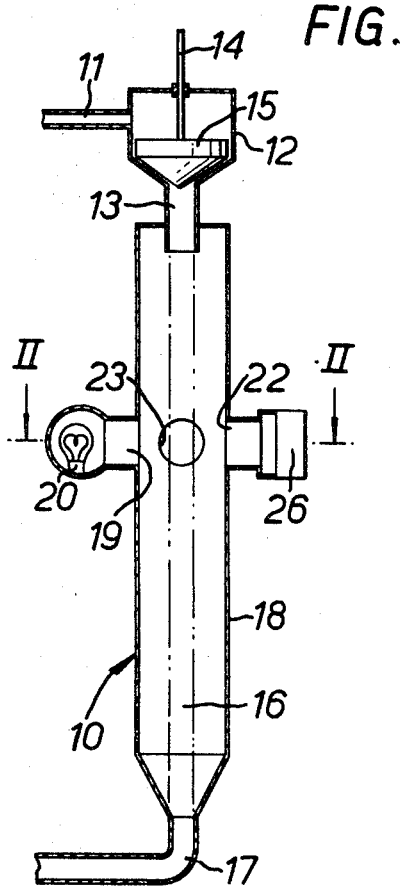

United States Patent

[11] 3,581,085

| [72] | Inventor | Sonja I. Barrett<br>Middle Farm, Watereaton, Oxford,<br>Oxfordshire, England |
|---|---|---|
| [21] | Appl. No. | 730,253 |
| [22] | Filed | May 20, 1968 |
| [45] | Patented | May 25, 1971 |
| [32] | Priority | May 26, 1967 |
| [33] | | Great Britain |
| [31] | | 24592/67 |

[54] ULTRAVIOLET FLUORESCENT ANALYZER FOR MONITORING OF OIL IN DISCHARGE BALLAST
16 Claims, 4 Drawing Figs.

[52] U.S. Cl. .................................................. 250/43.5, 250/71
[51] Int. Cl. .................................................. G01n 21/26
[50] Field of Search........................................... 250/43.5, 51.5, 71, 71 (G), 43.5 (D), 43.5 (FC), 218

[56] References Cited
UNITED STATES PATENTS

| 2,263,108 | 11/1941 | Stuart........................... | 250/71G |
| 3,182,193 | 5/1965 | Ellner et al. ................... | 250/43.5 |
| 3,204,097 | 8/1965 | Moffat et al. .................. | 250/43.5X |
| 3,259,743 | 7/1966 | Pick et al. ..................... | 250/51.5 |

Primary Examiner—James W. Lawrence
Assistant Examiner—A. L. Birch
Attorneys—Manahan and Wright and Donald F. Wohlers ABSTRACT: A continuous monitoring system for measuring the oil content of discharged ballast water based on the use of an ultraviolet fluorescence meter. The meter operates by passing ultraviolet light through a sample jet of water, the fluorescent visible light being measured by a filter-photocell combination angled to the incident beam. At elevated oil concentrations, the meter response diminishes as both ultraviolet and visible light are cut off by the increasing amounts of dark oil present, thus giving a false reading. A photocell or fluorescent indicator screen is therefore proposed as a warning device to be used in conjunction with the above monitoring system, to indicate when the emerging ultraviolet light is obscured by excess quantities of oil.

PATENTED MAY 25 1971  3,581,085

SHEET 1 OF 2

PATENTED MAY 25 1971 3,581,085

SHEET 2 OF 2

ULTRAVIOLET FLUORESCENT ANALYZER FOR MONITORING OF OIL IN DISCHARGE BALLAST

The present invention relates to the monitoring of contaminants in a liquid.

It is known that when certain materials are subjected to radiation of one wavelength, they emit radiation of another wavelength. An example of this is the visible fluorescence of mineral oils when irradiated with ultraviolet light. from When materials having such properties are admixed with substances devoid of such properties, it is possible to detect the presence of the materials by irradiating the mixture with radiation of one wavelength and to observe the emission of radiation of a different wavelength: this detection may be used quantitatively. For exaMple, it has been proposed to determine the amount of oil contaminating water discharged from ships ballast-tanks by subjecting the water to ultraviolet radiation and observing the intensity of visible fluorescence by means of a suitable photo cell.

It has been found that at relatively low oil concentrations, the intensity of fluorescence is in proportion to the oil concentration but that as a critical oil concentration is approached the intensity of fluorescence becomes less dependent on the oil concentration, and that when the critical concentration has been exceeded, the intensity of fluorescence begins to decrease. The decrease in fluorescence is believed to be due to increased absorption of visible radiation in the oil particles, to occlusion of the incident radiation by oil particles nearer to the radiation source from more distal oil particles, and to the phenomenon known to those skilled in the art as "quenching."

Thus when there is a relatively low intensity of observable fluorescence, it cannot be ascertained whether the oil concentration is higher or lower than the critical concentration.

According to the present invention, contaminants in a liquid are monitored by directing radiation at the liquid, and detecting radiation of changed and unchanged wavelengths emitted from the liquid.

When the contaminant in the liquid is a mineral oil, the incident radiation may be ultraviolet radiation and the radiation of changed wavelength may be visible fluorescence, (provided that the liquid itself does not fluoresce).

The radiation of unchanged wavelength emitted from the liquid may be either transmitted radiation or radiation which has been scattered by the contaminants.

The variation in intensity of the radiation of unchanged wavelength is relatively small and insensitive as the contaminant concentration varies, compared with the corresponding variation in the intensity of the radiation of changed wavelength. Accordingly, variations of the latter are utilized to monitor the contaminants in the liquid. The intensity of the radiation of unchanged wavelength provides an indication of whether the aforesaid critical contaminant concentration has been exceeded, and hence enables the intensity of radiation of changed wavelength to be used to determine the contaminant concentration on both sides of the critical concentration. Thus, a relatively low intensity of radiation of changed wavelength can indicate either a relatively low or a relatively high contaminant concentration. If the transmitted radiation of unchanged frequency is of relatively low intensity, it is clear that the contaminant concentration indicated by the radiation of changed frequency is high. In such circumstances, where the contaminant is insoluble in the liquid, the scattered radiation of unchanged frequency will be of relatively high intensity.

There may be provided a warning device which operates when either the intensity of transmitted radiation of unchanged wavelength is of less intensity than a selected intensity, or the intensity of scattered radiation of unchanged wavelength is of greater intensity than a selected intensity.

The liquid may be supplied in the form of a stream towards which the incident radiation is directed, and the stream may pass through a conduit having respective windows for the incident and emitted radiations.

There may be provided a nozzle to direct the stream through the conduit substantially clear of the walls thereof to avoid deposition of the liquid or the contaminant on the walls of the conduit.

It has been observed that the radiation characteristics of insoluble contaminants changes with the size of the contaminant particles, and that the intensity of emitted radiations attains a maximum at a particular mean particle size. IN order that the invention may be used to obtain consistent results, insoluble contaminants may be subjected to a homogenizing and/or agglomerating process to provide contaminant particles substantially of a desired mean particle size upstream of the incident radiation.

The liquid may be supplied from a reservoir, and there may be a valve for regulating the discharge of liquid from the reservoir, some liquid being supplied to the conduit for monitoring, and there may be means for operating the valve to interrupt the discharge of liquid when the amount of radiation of unchanged wavelength is indicative of a concentration of contaminants at least equal to a maximum desired concentration of contaminants in the liquid.

The valve may be a three-way valve and may serve to return liquid to the reservoir when it interrupts the discharge of liquid therefrom.

Figure 3:
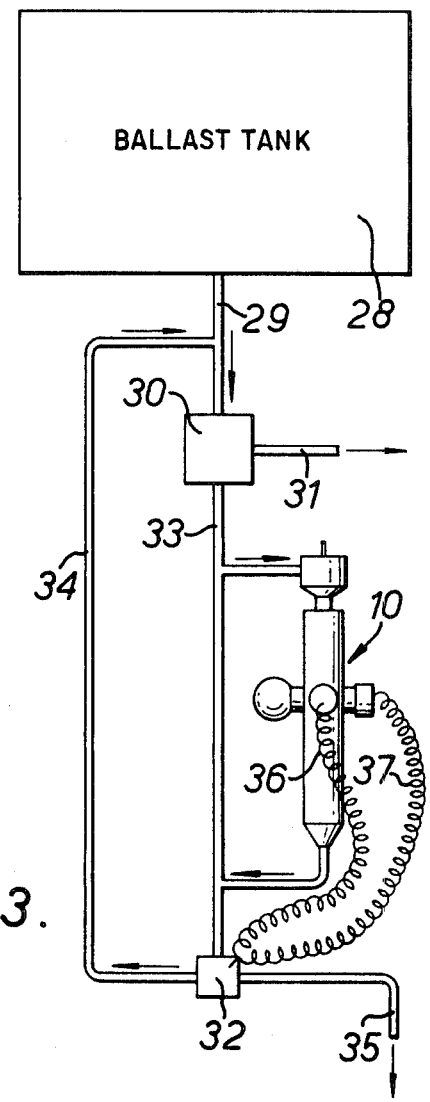
Figure 2:
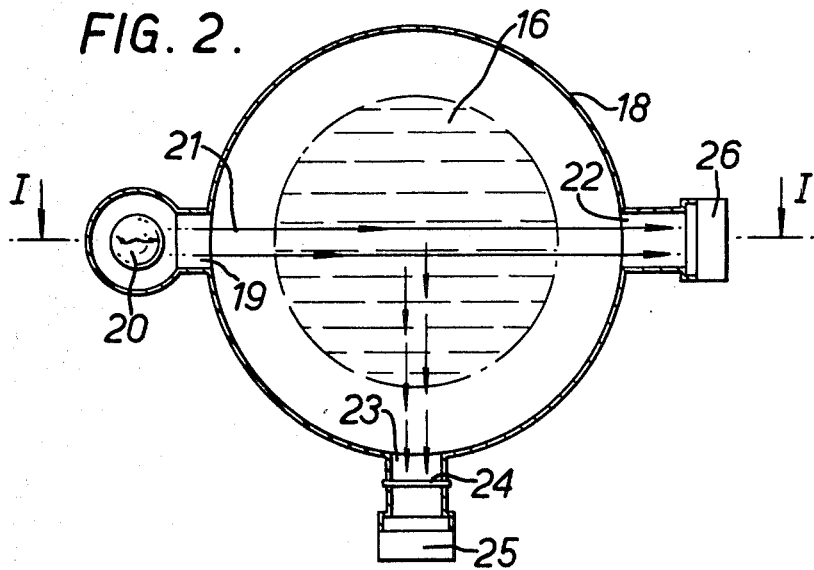
Figure 4:
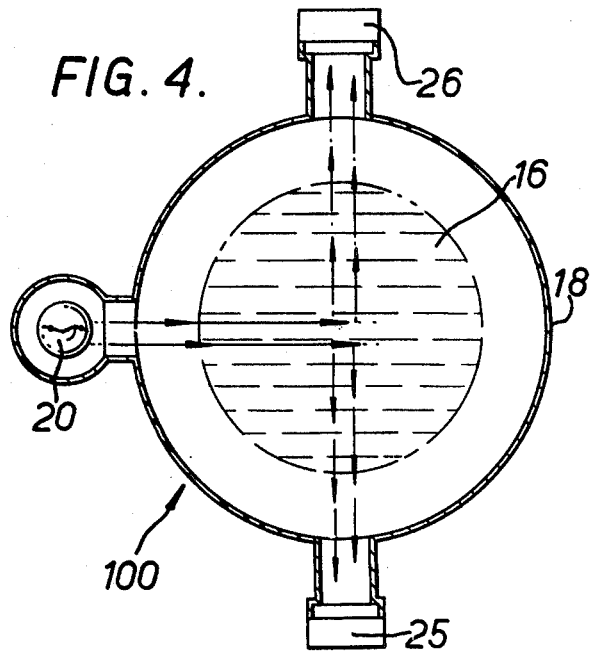

Some nonlimitative exemplary embodiments of the invention will now be described with reference to the accompanying drawings, in which:

FIG. 1 is a cross-sectional view taken in the plane I–I of FIG. 2 of apparatus embodying the invention for determining the concentration of oil in an oil-water mixture, FIG. 2 is a cross-sectional of the apparatus of FIG. 1 taken in the plane II–II of FIG. 1, FIG. 3 schematically illustrates the apparatus of FIG. 1 incorporated in the ballast-water discharge system of a ship, and FIG. 4 illustrates another form of apparatus in accordance with the invention in a cross-sectional view corresponding to that of FIG. 2.

Referring first to FIGS. 1 and 2, the apparatus, generally denoted by reference 10, comprises an inlet tube 11 which enables the oil-water mixture to enter a reservoir 12 having a conical bottom. The reservoir 12 is provided with a calibrated orifice tube 13 in its base so that during normal operation, the mixture will have a predetermined residence time in the reservoir 12. A rotatable shaft 14 extends through the top of the reservoir 12 and carries a homogenizer in the form of a metal cone 15 at its free end which cooperates with the conical bottom of the reservoir 12 with a small clearance there between. The other end (not shown) of the shaft 13 is connected to a pneumatic motor through suitable gearing so that during normal operation, the speed of rotation of the metal cone 15, the clearance from the conical bottom of the reservoir 12 and the residence time are together sufficient to break down the oil particles in the mixture to a preferred mean diameter of substantially 0.7 microns. The mixture leaves a nozzle at the lower end of the orifice tube 13 and falls freely as a jet 16 to an outlet tube 17. The jet 16 is concentrically enclosed within a tube 18 whose walls are spaced from the path of the jet to avoid as far as possible the deposition of any oil thereon.

The tube 18 is provided with two openings diametrically opposite each other and a third opening located between the two opposed openings.

At one of the opposed openings 19 is disposed a source 20 of ultraviolet radiation incorporating a collimating device so that during operation a beam 21 (FIG. 2 only) of ultraviolet radiation is directed into the jet 16 towards the opposite opening 22. The collimating device may be one or more slits in an otherwise radiation-opaque screen (not shown).

At the opening 23 between the opposed openings 19 and 22 is located an ultraviolet filter 24 which interrupts the passage of ultraviolet radiation, and outwardly disposed of the filter 24 is a device 25 incorporating a photocell which responds to the radiation passing through the filter 24.

Under the influence of the ultraviolet radiation, the oil particles in the jet 16 fluoresce in the visible part of the spectrum. Some of the visible radiation will be detected by the photocell of the device 25 and the device 25 may register and/or record the amount of radiation thus detected. When the mean oil particle size is about 0.7 microns, the amount of radiation detected should be a maximum for the particular concentration of oil in the jet 16.

At the opening 22 is located a device 26 which responds to ultraviolet radiation, and provides an indication of the amount of ultraviolet radiation absorbed by the jet 16. The device 26 may be simply a screen a of material which fluoresces when receiving ultraviolet radiation or it may be an ultraviolet responsive photocell.

When the oil concentration in the jet 16 is low, the device 25 registers a low amount of fluorescence while the device 26 has a strong response since the jet 16 absorbs relatively little of the ultraviolet radiation.

When the oil concentration in the jet 16 is high, the device 25 registers a low amount of fluorescence in the jet 16 and the device 26 has a weak response due to the high degree of absorption of radiation by the jet 16.

It will be appreciated that the device 26 serves to indicate whether or not the response of the device 25 is indicative of an oil concentration below or above the aforesaid critical concentration. When the device 26 comprises a photocell, the photocell causes a warning device (not shown) such as an alarm bell to be activated when the response of device 26 is weak. A weak response may be due to a high concentration of oil in the jet 16 or due to a coating of oil on the window of the device 26 at opening 22. Such a coating prevents correct working of the apparatus 10.

The apparatus 10 may be employed for the continuous automatic monitoring of liquid mixtures being discharged from a tank. Thus referring now to FIG. 3, there is shown a ship's water ballast tank 28 the content of which may be discharged through line 29 by a suitable pump (not shown) to an oil-water separator 30. The separated oil is removed via line 31 and the purified ballast water passes to a three-way power-actuated valve 32 via line 33. An apparatus 10 as described in connection with FIGS. 1 and 2, is connected in parallel with line 33 so that a small proportion of the liquid in line 33 passes through the apparatus 10.

The valve 32 is capable of partially of wholly directing the liquid in line 33 to a return line 34 which returns the liquid to the line 29 so that it reenters the separator 30, and to a discharge line 35 terminating in an overboard port (not depicted) in the side of the ship.

The device 25 of apparatus 10 is connected to a part of the valve 32 by a signal-conducting line 36 and the device 26 of the apparatus 10 is connected to another part of the valve 32 by another signal conducting line 37. The arrangement is such that as signals generated by the device 25 vary in strength, the valve 32 progressively opens and closes the passage for liquid from line 33 to line 35 in accordance with the strength of the signal, but that when a signal of less than a selected intensity is generated by the device 26, an override operates and the valve 32 fully closes the passage for liquid from line 33 to line 35 so that all of the liquid is returned to the separator 30. The manner of effecting this override is well known to those skilled in the art and will not be further described.

The signal from device 25 may be electrical and derived from a photocell (not shown) which is exposed to radiation passing through the ultraviolet filter 24 of FIG. 2. Similarly, the device 26 may incorporate a photocell (not shown) which either scans the referred to fluorescent screen to generate an electrical signal, or is sensitive to ultraviolet radiation so that the screen can be omitted. The signals from the devices 25, 26 may be amplified if necessary.

The apparatus 10 controls the valve 32 in the sense that if the oil concentration is low and less than the referred to critical concentration, the valve 32 will be under the control of the device 25. However, when the critical concentration of oil in water is approached or attained, the signal generated by the device 25 will not be truly indicative of the oil concentration, but the signal generated by the device 26 will then be diminished to the extent that the override in valve 32 operates to close the passage for liquid from line 33 to line 35 so that the liquid is returned to the separator 30.

Although the ultraviolet radiation source 20, the devices 25 and 26, the separator 30 and the valve 32 have all been briefly and functionally described, their mode of construction will be readily apparent to those skilled in the art.

In a modification of the system of FIG. 3, the valve 32 may be a simple two-position on-off valve arranged so that in one position, all of the flow in line 33 is permitted to pass to line 35, while in the other position, the flow to line 35 is wholly interrupted and the liquid in line 33 is returned via line 34 to the separator 30. Alternatively, when the flow to line 35 is interrupted, the diverted liquid may flow via line 34 to a storage tank (not shown) for further processing. The power-activating part of the valve 32 is arranged to cause the valve 32 to interrupt the flow from line 33 to line 35 when the strengths of the signals from devices 25 and 26 attain preselected low valves.

The apparatus 100 of FIG. 4 is of similar construction to that of FIGS. 1 and 2 except that the device 26 is 90° displaced from the ultraviolet radiation source 20 instead of 180° as in the apparatus 10 of FIGS. 1 and 2. In this position, the device 26 will receive only ultraviolet light scattered by the oil particles.

The apparatus 100 is employed in a slightly different fashion to that of apparatus 10 since as the oil concentration increases, the amount of scattered radiation registered by the device 26 will also increase, and if the oil concentration increases beyond the aforesaid critical concentration at which the fluorescence registered by device 25 decreases, the scattered radiation received by the device 26 will continue to increase.

IF the apparatus 100 is used with a warning device (not shown), such as a bell, the warning device is operated when the signal from device 26 attains at least a selected strength.

When the apparatus 100 is to be employed in a ship's ballast-water discharge system as depicted in FIG. 3, the operation of the three-way valve 32 needs to be modified so that the override operates when the signal strength from the device 26 exceeds a selected value corresponding to oil contamination at least equal to the maximum desired concentration.

As depicted in FIG. 4, the device 26 is opposite device 25. However, the two devices can be placed in any relative positions including side-by-side, or even replaced by a single device (not shown) which responds alternatively to visible fluorescence and scattered ultraviolet radiation. The alternate observations are taken by alternately interposing in front of the device filters which respectively allow through ultraviolet and visible radiation from the stream 16. In one suitable form (not shown), the filters may comprise peripherally spaced zones on a rotatable disc: when the disc is rotated, the zones permitting the passage of visible and ultraviolet radiation are alternately presented to the device. When an apparatus 100 having such a device is incorporated in a modified ship's ballast-water discharge system as described above in relation to the apparatus 100 of FIG. 4, the signals from the device need to be supplied to the valve 32 alternatively via lines 36 and 37 in synchronism with the presentation of the alternate filters. This is accomplished by means of any suitable switching mechanism. The type of switching mechanism which would be suitable will be well known to those skilled in the art.

The invention will may take forms other than those specifically described.

We claim:

1. Apparatus for monitoring a liquid for contaminants which fluoresce in the visible part of the spectrum when irradiated with ultraviolet radiation, the apparatus comprising first means for directing ultraviolet radiation at the liquid, second means for detecting ultraviolet radiation emitted from the liquid, third means for enabling detection to be effected of fluorescent radiation in the visible part of the spectrum only, and fourth means operably associated with said second means for indicating when the amount of transmitted ultraviolet radiation detected by said second means is less than a predetermined amount.

2. Apparatus according to claim 1 in which said second means is arranged to receive ultraviolet radiation transmitted through the liquid.

3. Apparatus according to claim 1 in which the second means is arranged to receive ultraviolet radiation scattered in the liquid.

4. Apparatus according to claim 3 wherein said fourth means comprises a warning device and means for operating the warning device when the amount of scattered ultraviolet radiation detected by the second means is greater than a selected amount.

5. Apparatus for monitoring a liquid for contaminants which fluoresce in the visible part of the spectrum when irradiated with ultraviolet radiation, the apparatus comprising first means for directing ultraviolet radiation at the liquid, second means for detecting ultraviolet radiation emitted from the liquid and third means for enabling detection to be effected of fluorescent radiation in the visible part of the spectrum only, a conduit having windows therein, said first, second and third means being disposed externally of respective ones of said windows, and nozzle means for directing a stream of liquid through said conduit.

6. Apparatus according to claim 5 in which the nozzle is arranged to direct the stream of liquid through the conduit substantially clear of the walls thereof.

7. Apparatus according to claim 5 comprising means for homogenizing and/or agglomerating insoluble contaminants substantially to a desired mean particle size upstream of the conduit.

8. Apparatus according to claim 5 comprising a reservoir for said liquid to be monitored, a valve for regulating the discharge of liquid from the reservoir, means for supplying at least some liquid from the reservoir to the said conduit and means for operating the valve to interrupt the discharge of liquid when the amount of ultraviolet radiation detected by the second means is indicative of a concentration of contaminants at least equal to a maximum desired concentration of contaminants in the liquid.

9. Apparatus according to claim 8 in which the said valve is a three-way valve and serves to return liquid to the reservoir when it interrupts the discharge of liquid from the reservoir.

10. A method of monitoring liquid for contaminants which fluoresce in the visible part of the spectrum when irradiated with ultraviolet radiation, the method comprising the steps of directing ultraviolet radiation at the liquid, detecting ultraviolet radiation emitted from the liquid, detecting radiation emitted by the liquid in the visible part of the spectrum and providing an indication when the amount of detected ultraviolet radiation emitted from the liquid is less than a predetermined amount.

11. A method according to claim 10 in which the emitted radiation comprises changed and unchanged wavelengths, including the step of transmitting the unchanged wavelength through the liquid.

12. A method according to claim 10 wherein the step of providing an indication when the amount of transmitted ultraviolet radiation detected is less than a predetermined amount includes the step of operating a warning device in response to the amount of emitted ultraviolet radiation when it is below a predetermined amount.

13. A method according to claim 10 in which the emitted radiation comprises changed and unchanged wavelengths, including the step of scattering the unchanged wavelength in the liquid.

14. A method according to claim 13 wherein the step of providing an indication when the amount of transmitted ultraviolet radiation is detected is less than a predetermined amount includes the step of operating a warning device when the amount of scattered radiation exceeds a selected amount.

15. A method according to claim 10 in which the liquid is subjected to a homogenizing and/or agglomerating process to homogenize and/or agglomerate insoluble contaminants substantially to a desired mean particle size before the radiation is directed at the liquid.

16. A method according to claim 10 in which the liquid is supplied as a stream at which the radiation is directed.